(12) United States Patent
Kelly

(10) Patent No.: US 7,630,779 B2
(45) Date of Patent: Dec. 8, 2009

(54) SELF COMPENSATING CLOSED LOOP ADAPTIVE CONTROL SYSTEM

(75) Inventor: Anthony L. Kelly, Dooradoyle (IE)

(73) Assignee: Analog Devices, Inc., Norwood, MA (US)

( * ) Notice: Subject to any disclaimer, the term of this patent is extended or adjusted under 35 U.S.C. 154(b) by 587 days.

(21) Appl. No.: 11/141,810

(22) Filed: Jun. 1, 2005

(65) Prior Publication Data

US 2006/0276915 A1 Dec. 7, 2006

(51) Int. Cl.
*G05B 13/02* (2006.01)
*G05B 19/18* (2006.01)

(52) U.S. Cl. .......................... 700/37; 700/44; 700/250

(58) Field of Classification Search .......... 700/28, 700/29, 30, 31, 32, 37
See application file for complete search history.

(56) References Cited

U.S. PATENT DOCUMENTS

| | | | | |
|---|---|---|---|---|
| 5,301,101 A | * | 4/1994 | MacArthur et al. | 700/36 |
| 5,394,071 A | * | 2/1995 | Thoen | 318/610 |
| 5,394,322 A | * | 2/1995 | Hansen | 700/37 |
| 5,424,942 A | * | 6/1995 | Dong et al. | 700/44 |
| 5,587,889 A | * | 12/1996 | Sacherman | 361/809 |
| 6,665,410 B1 | * | 12/2003 | Parkins | 381/71.1 |
| 2003/0195641 A1 | * | 10/2003 | Wojsznis et al. | 700/42 |
| 2005/0261898 A1 | * | 11/2005 | Van Klinken | 704/219 |
| 2006/0129250 A1 | * | 6/2006 | Yasui et al. | 700/19 |
| 2007/0021850 A1 | * | 1/2007 | Wojsznis et al. | 700/42 |

OTHER PUBLICATIONS

Rinne et al., Control of DC-DC Converters by Direct Pole Placement and Adaptive Feedforward Gain Adjustment, IEEE Explore, Mar. 6, 2005.*
Fenglin et al., Applying Adaptive Recursive Filtering to System Identification, IEEE Explore, Oct 14, 1996.*
Mehta et al., Performance Characteristics of an Adaptive Controller Based On Least Mean Square Filters, AIAA Guidance Navigation and Control Conference, Aug. 18, 1986.*
Inhyuk et al., The Auto-tuning PID Controller using the Parameter Estimation, Proceddings of the 1999 IEEE/RSJ International Conference on Intellignet Robots and Systems, 1999.*
Vaidyanathan, P.P. et al, "On the minimum phase property of prediction-error polynomials", IEEE Signal Processing Letters, vol. 4, No. 5. May 1997, pp. 126-127.

* cited by examiner

*Primary Examiner*—Darrin Dunn
(74) *Attorney, Agent, or Firm*—Koppel, Patrick, Heybl & Dawson (57) ABSTRACT

An adaptive control system is described. The system includes a control having a plurality of control parameters, the control parameters providing for control of an associated plant. The control parameters are tuned using a prediction error filter, the prediction error filter selecting values of the control parameters that minimize the values of a prediction error between actual and predicted values of an autoregressive process.

34 Claims, 12 Drawing Sheets

SELF COMPENSATING CLOSED LOOP ADAPTIVE CONTROL SYSTEM

FIELD OF THE INVENTION

The invention relates to control systems and in particular to a closed loop control system including a plant and a controller. The invention more particularly relates to a control loop configured to provide a level of self-compensation. In a preferred embodiment the invention provides a self-compensating regulator for switch-mode power supplies in closed-loop.

BACKGROUND

Control loop systems are well known. Typically in such systems a component of the system, the plant, is controlled by a controller. By providing the controller and the plant in a feedback configuration it is possible to reduce discrepancies between the output of the plant and the desired output of the system. As well as these discrepancies, in all control loops there is uncertainty about the exact nature of the plant. The control loop reduces the effect of this uncertainty, but designing the control loop to be robust in this way requires some compromises.

Using an adaptive controller is another way to handle uncertainty in the plant. Typically, adaptive controllers can handle a wider range of uncertainty compared to a standard control loop. When the desired output is static for most of the time, then the control loop is normally called a regulator. Adaptive control loops or regulators are generally provided either in a direct or indirect configuration. Both configurations require knowledge of the system identifiers of the plant. Whereas the traditional direct self-tuning regulators use estimates of these system identifiers as an input to the regulator, the indirect self-tuning regulators involve a two-step process of (i) system identification of the plant parameters; and (ii) automatic design of the control parameters based upon the estimated plant parameters.

Estimation of the plant dynamics, by either the direct or indirect method, requires operation of the control system in either closed-loop or open-loop configuration. Persistent excitation is an issue for closed-loop system identification. As the system is in regulation, the dynamics of the loop are not exercised persistently, thereby impeding identification of the loop dynamics. An open-loop approach, whilst not suffering from the problem of persistent excitation, has an inherent issue in that the loop regulation breaks down during system identification and there is therefore the possibility of transients during the system identification stage corrupting the system. Open-loop operation is unsuitable for a system which continuously adapts to environmental parameter changes. On the whole, closed-loop estimation is preferred, despite the issues of persistent excitation.

Accordingly, the traditional self-tuning regulators have a requirement to identify the parameters of the plant in a closed-loop control system in which there is a lack of persistent excitation. They typically operate on the principle of certainty equivalence in which the estimated plant parameters are considered to be the correct values for the purposes of designing the controller parameters. Therefore, there is a requirement for the plant parameters to be estimated accurately, and for the estimated parameters to converge to the correct values as quickly as possible. System identification algorithms which meet this requirement are computationally complex, and therefore not suitable for a low cost ASIC implementation.

There is therefore a need to provide a control loop system that may be implemented in a closed loop configuration and yet provides for an estimation of the desired control parameters with low computational complexity to enable operation of the control system.

SUMMARY

These and other needs are addressed by a control loop configuration which provides for closed loop operation of the control system and enables an estimation of the control parameters necessary for the operation of the loop. An embodiment of the invention also provides for a self-tuning of these parameters in that the controller is configured to sense the requirement for modification of the parameters during the operation of the loop and effect a modification as required without any input from external agents. The control loop configuration may be provided in an ASIC implementation.

In accordance with some embodiments, a low complexity method is provided of implementing a self-compensating regulator for switch-mode power supplies, which operates entirely in closed-loop is provided. A regulator provided in accordance with such teachings performs well over a wide-range of power-train component values, and is suited to a cost-effective ASIC implementation.

Accordingly provides a control loop having a plant provided in a feedback configuration with a controller for that plant and wherein the controller includes a prediction error filter so as to provide for a self-tuning of the controller.

The invention will now be described with reference to the following exemplary illustrative embodiments.

DETAILED DESCRIPTION

Aspects of the invention will now be described with reference to the exemplary embodiments of FIGS. 1 to 13.

Figure 1:
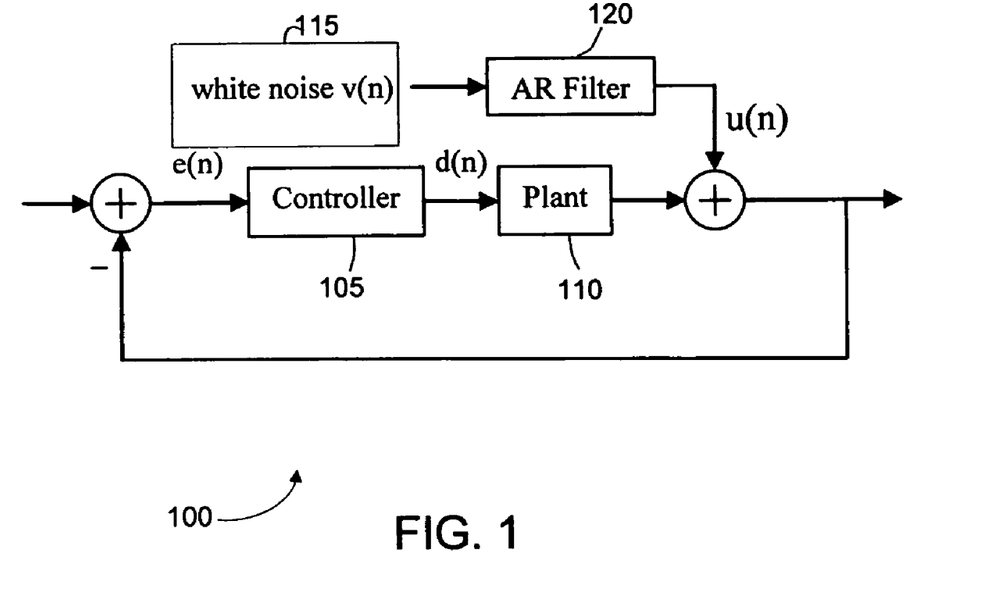
FIG. 1 shows in schematic form a circuit configuration in accordance with an exemplary embodiment of some aspects of the invention.

As shown in FIG. 1, a control system 100 includes a controller 105 which drives, in a closed loop feedback configuration, a plant 110. The plant 110 is designed to perform a process based on a plurality (N) of plant parameters. The controller 105 has a set of control parameters dictating the time and frequency response of the controller. The overall closed loop response of the system is a function of the plant and controller parameters. In operation, once the system has achieved regulation, the output of the system should remain constant. Disturbances introduced into the loop are reduced or minimised by the action of the control loop which attempts to maintain the output in its settled condition. However, disturbances introduced into the loop can lead to a requirement for a modification of the control parameters. In the embodiment of FIG. 1, the disturbances are exemplified by a white noise generator 115, of zero mean, driving an auto-regressive (AR, all-pole) filter 120. In response to a reaction of the system to the introduction of these disturbances to the system, the controller is configured to effect a modification of the control parameters.

Figure 2:
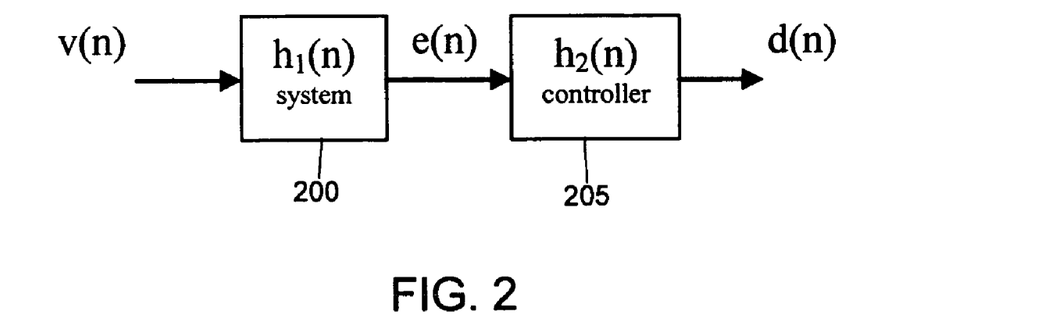
FIG. 2 shows, again in schematic form, components useful for understanding the mechanism for the operation of a control loop in accordance with the teachings herein.

The system of FIG. 1 can be considered a discrete time system and can be modelled from the noise source to the output of the self-tuning controller. As shown in FIG. 2, $h_1(n)$ 200 is a discrete-time system modelling the control error signal, consisting of the AR filter of the disturbance process and the loop response, $h_2(n)$ 205 models the self-tuning controller and $v(n)$ is a white noise source of zero mean. If $h_2(n)$ can be made an inverse system of $h_1(n)$, then the output of $h_2(n)$ will be white noise. In this sense, the system poles of $h_1(n)$ are cancelled by the zeros of $h_2(n)$. It will be understood that complete cancellation of the poles is not desirable, as the loop dynamics will then be determined by the plant, which may be unknown. Constrained cancellation may be applied in the context of a suitable control structure, and in accordance with the present invention such a constraining may be achieved in preferred embodiments by providing the controller as a minimum order controller having N−1 parameters, where N is the order of the plant. For example if the plant is a $2^{nd}$ order plant, then the controller requires 1 (i.e. 2−1) control parameter. A loop structure which may be compensated by a known number of zeros, can be effectively compensated using this technique, with the zeros being placed by the controller, $h_2(n)$.

An exemplary embodiment provides the self-tuning controller by means of a prediction-error filter (PEF). Its principle of operation may be explained with reference to FIG. 3 and understood by viewing it as an AR process analyser 300, which is the inverse-filter of an AR filter 305, where $v(n)$ is white-noise of zero mean, $u(n)$ is the AR process which represents disturbances on the regulator output. It will be noted that the white noise signal, $v(n)$ is the input of the AR filter 305, but the output of the inverse filter 300.

Figure 3:
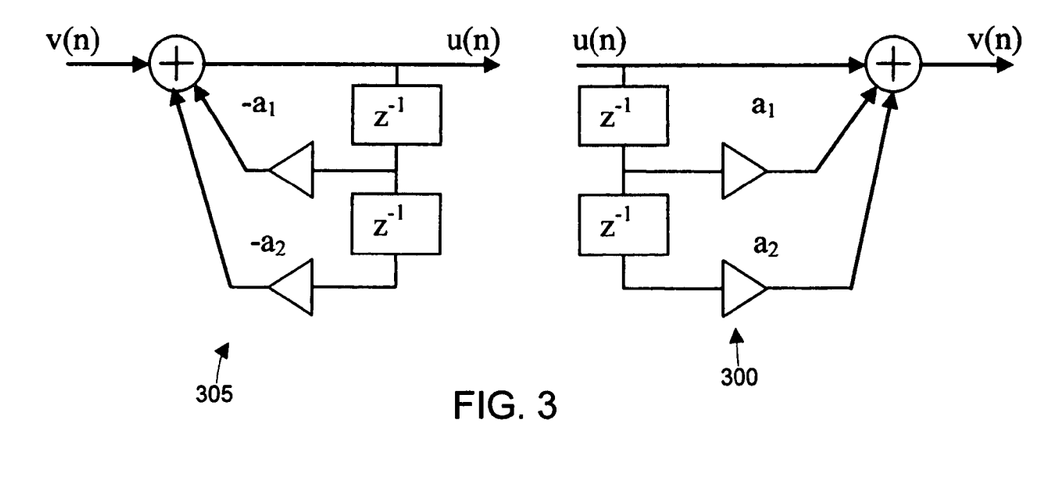
FIG. 3 shows an AR process generator (left), and AR process analyser (right).

Both filters can be described by equation 1:

$$v(n)=u(n)+a_1u(n-1)+a_2u(n-2)+\ldots+a_ku(n-k) \quad (1)$$

Thus, it will be understood that the Prediction-Error Filter (PEF) is the inverse filter of an AR process, and as such, is an all-zero, or finite impulse response (FIR) filter. In terms of FIG. 2, $h_1(n)$ represents an AR process generator, and $h_2(n)$ is the all-zero Prediction-Error Filter. If the PEF is the same order as the AR process then the PEF coefficients take on the same values as the corresponding parameters of the process. If the process is not truly AR, or not of the same order, then the PEF coefficients approximate the process. It can be shown and is known from Vaidyanathan, P. P., J. Tuqan, et al. (1997). "On the minimum phase property of prediction-error polynomials." *IEEE Signal Processing Letters* Vol. 4, No. 5: 126-127, assuming the AR process is stable, that the PEF coefficients will be minimum-phase. It will therefore be understood that a PEF filter with judiciously selected control parameters may be used to provide a control of the overall loop.

The question therefore arises, how are these control parameters judiciously selected? In a non-adaptive methodology it is possible to select the parameters as part of the design specification where the choice of the best parameters necessary for the normal operation of the control system may be determined. However, there is no necessity to provide the control parameters as part of the design specification for the system in that there is provided an adaptive selection of these parameters as part of the operation of the control system.

It is known to provide the coefficients of a PEF by a number of techniques including methods such as the Levinson-Durbin and Schur algorithms. Although these techniques do provide correct coefficients, they are computationally expensive and it would be desirable to provide an implementation that could be achieved with low computational complexity as a design constraint. The present invention addresses this in one embodiment by providing for an adaptive form of linear prediction using a least-mean-square (LMS) filter, the operation of which will be apparent to those skilled in the art, albeit for different applications to that used in this context.

Figure 4:
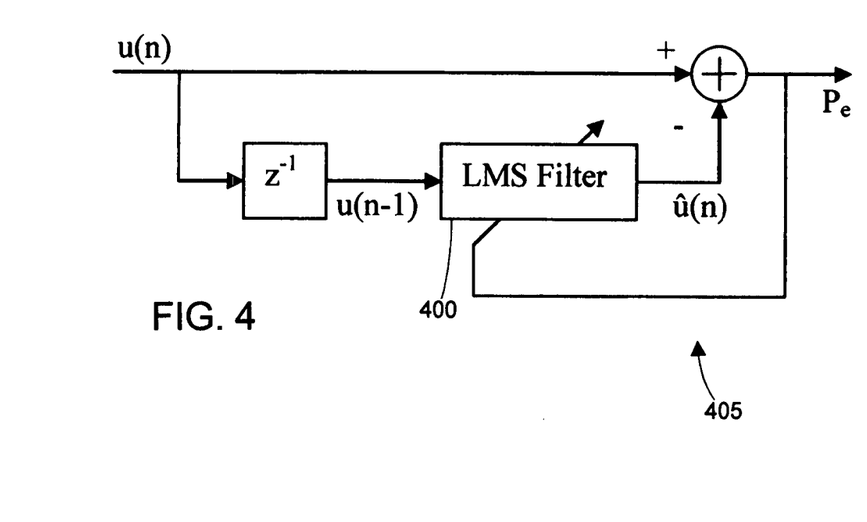
FIG. 4 shows components of a prediction error filter (PEF) implemented with a least-mean-squares filter (LMS).

FIG. 4, shows how an LMS filter 400 is used in a PEF 405 as a prediction filter, predicting $u(n)$. The error between the actual value and the prediction is the prediction error, $P_e$; hence the name. The action of the PEF works to minimize the prediction-error $P_e$, by feeding the prediction-error back to the LMS adaptive filter. In this way the LMS prediction is improved to optimise the prediction, which corresponds to a minimal prediction error. Because of its operation as a process analyser, a minimal $P_e$ signal resembles white noise. In the context of a control loop or regulator, we can conclude that a minimal $P_e$ corresponds to a stable system if the plant is stable.

It will be understood that various PEF coefficient values place the closed-loop poles in a variety of locations, and that in the general case one of those locations provides optimal regulation of disturbances. The operation of the PEF as a self-compensating controller is clear when we consider that a specific value of the PEF coefficients yields minimal output noise in response to disturbances, and that if the coefficient values deviate from those which provide optimal regulation, then by definition, the output noise power must increase. Therefore the noise power at any point in the loop must increase. In this way, a minimal Pe power or a minimal power at other points in the loop corresponds to optimal compensation for the given disturbance.

Figure 5:
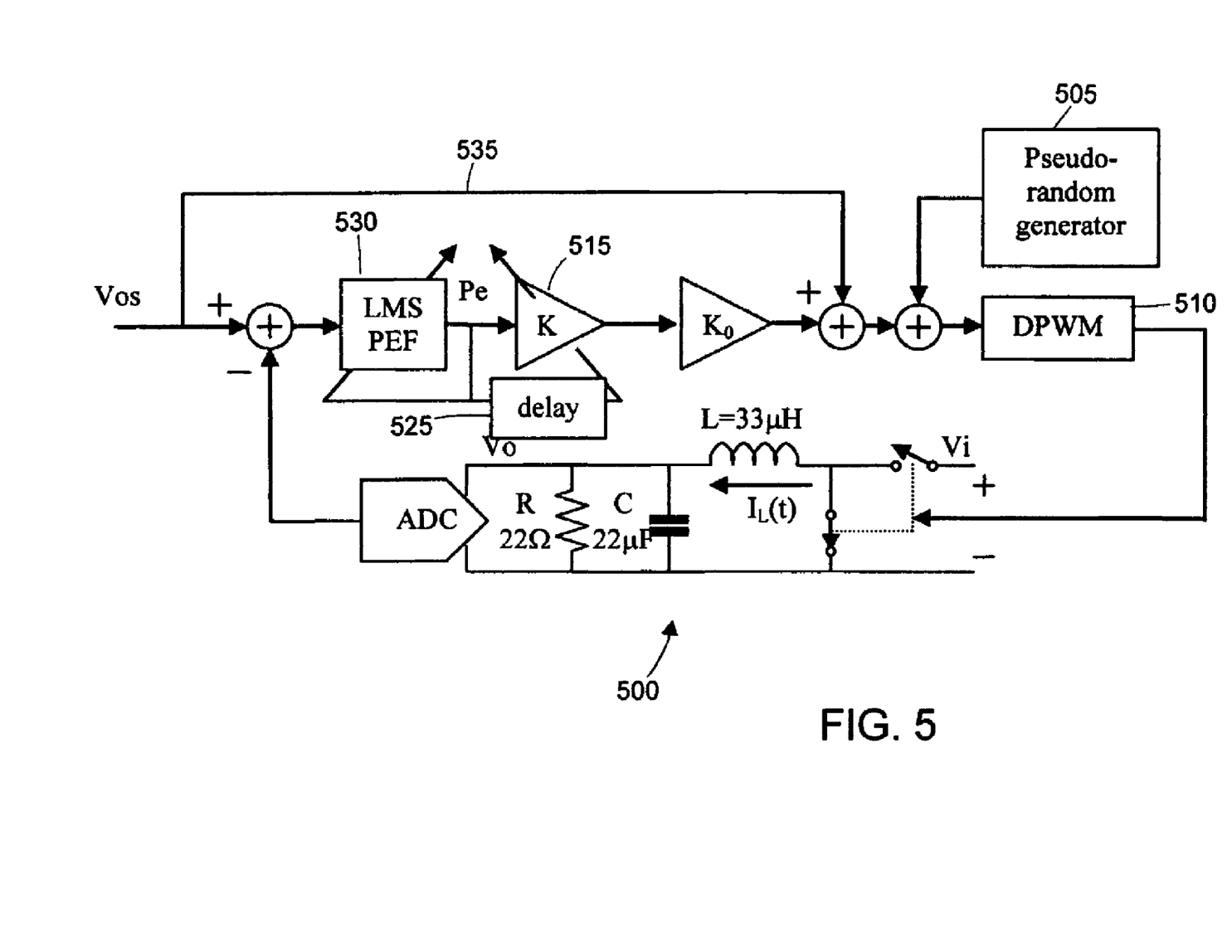
FIG. 5 shows a buck dc-dc converter with LMS Prediction Error Filter and gain adaptation.

It will be understood that heretofore that the invention has been described with reference to a generic plant. FIG. 5 shows an example of the type of plant that may be used as part of the control system of the present invention. In this embodiment, the technique of the present invention is applied to a switch-mode power supply (SMPS) 500. The configuration for the SMPS in this example is a non-isolated buck. It will be understood that switch-mode power supplies exist in many embodiments, and the techniques described herein are not limited to the non-isolated buck configuration. In certain applications, a pseudo-random disturbance 505 may be added, during the self-tuning procedure, in to the control loop before the digital pulse width modulator (DPWM) 510, thereby overcoming the problem of persistent excitation. This pseudo-random generator may be turned on and off as desired to accelerate the achieving of normal regulation.

The self-tuning scheme has been extended to include the adaptation of the gain factor $K_j$, which may be achieved by a 1-tap recursive least squares (RLS) or least mean squares (LMS) filter 515. Choosing the LMS filter over the RLS, yields a low complexity at the expense of a longer convergence time. The adaptive gain factor works in conjunction with a fixed gain 520, $K_0$; with the fixed gain providing a pseudo coarse tuning value and the adaptive gain the fine tuning required. Desirably, the value of the fixed gain is related to the values of the plant parameters and in this example of implementation in an SMPS it is found that having $K_0$ substantially equal to the inductor value/sample time that good results are achievable. Like the adaptive PEF, the gain adjustment works on the principle of minimising the prediction error power, which corresponds to an optimal loop gain, in the least squares sense. The error signal should desirably be delayed, by use of a fixed delay element 525, before being applied to the adaptive-gain filter 530, allowing the affect of the gain adjustment to propagate around the loop. In another embodiment the gain factor may be optimised to minimise the control error power. As the controller is an all zero filter, the control scheme incorporates setpoint feedforward 535, in order to introduce a zero steady state control error, and to ensure the regulator is stable at power on. It will be understood that the use of such a feedforward provides a robust performance by stabilising the plant before adaptation of the loop parameters, but equivalent means may be employed to achieve this depending on the nature of the plant and the desired controller. For example, the plant being controlled by the PEF could itself be composed of a control loop incorporating a plant with the purpose of the inner loop being to stabilise a high order system. Another method in accordance with the invention could provide for a seeding of the PEF weights so as to stabilise the control loop over a range of parameters of the plant, with the self-tuning optimising the loop response.

In practice, circuit non-idealities may prevent the feedforward from achieving zero steady state control error and therefore the PEF will react because the prediction error is required to be of zero mean in steady state. A further loop may be introduced which drives the steady state control error to zero, in the presence of circuit non-idealities, by manipulating a gain factor. In this way the PEF coefficients reflect a more accurate estimate of the process at its input.

During operation a number of stages can be identified. During start up of the control loop, the set point of the output and the actual output are both equal to 0. The set point Vos, is then slowly increased by means of a soft startup to the desired output. The adaptive gain is set to a low value (typically ⅟1000), which generates a pseudo open loop allowing persistent excitation, yet as there is not an actual open loop and the PEF weights have not converged, if a transient was introduced during this stage it would excite the PEF and the adaptive gain factor, causing their parameters to move closer to the optimal values and therefore, the closed loop nature of the circuit would become apparent, minimising any effect of the transient. The prediction error signal is monitored and if that deviates from what would be expected from a white noise response then both the PEF and adaptive gain react to restore the mean value to 0. As long as this is maintained then there is no need for these parameters to change.

Figure 6:
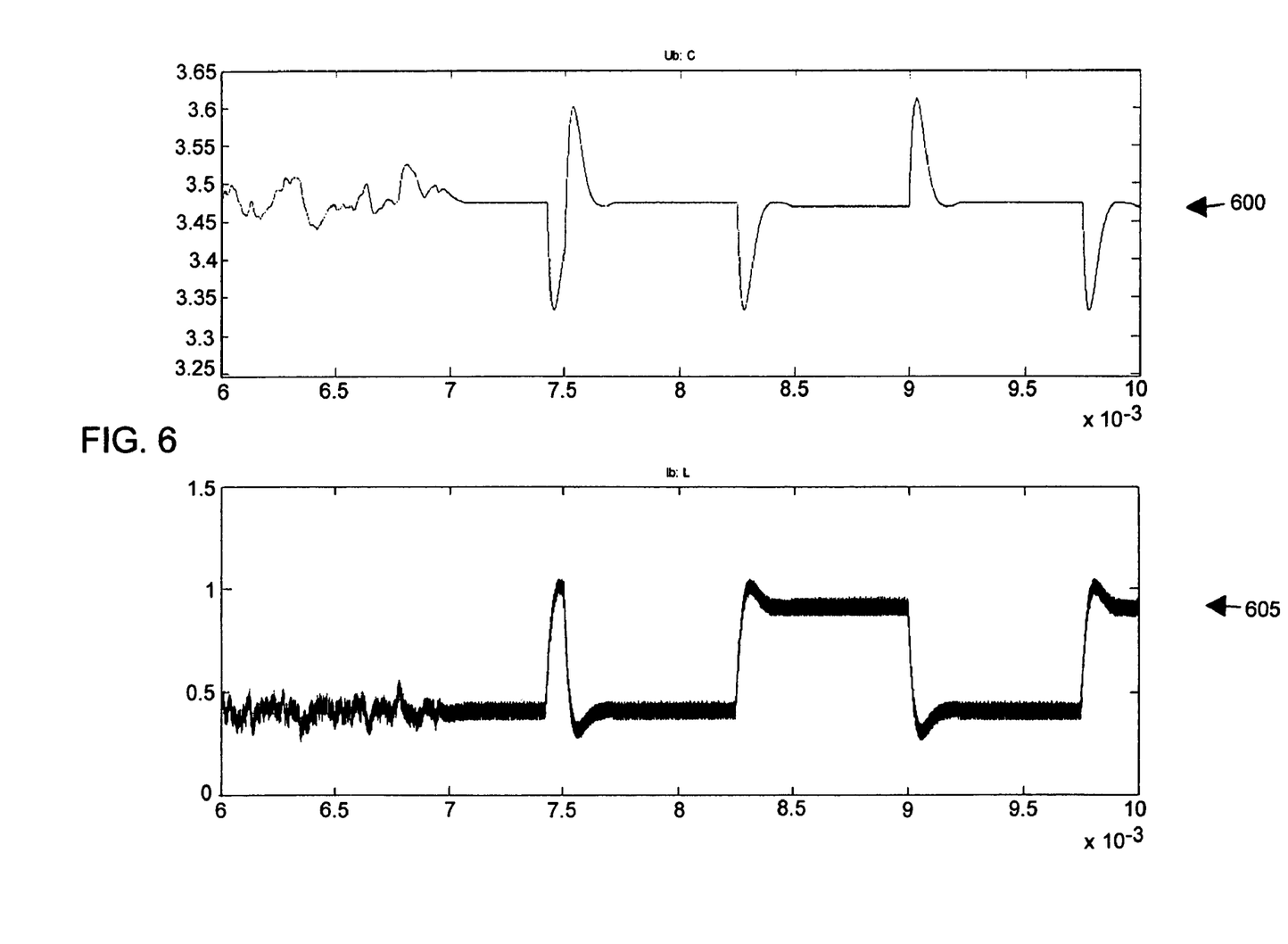
FIG. 6 shows capacitor voltage and inductor current of FIG. 5, after training in response to a 50% Load Step.
Figure 7A:
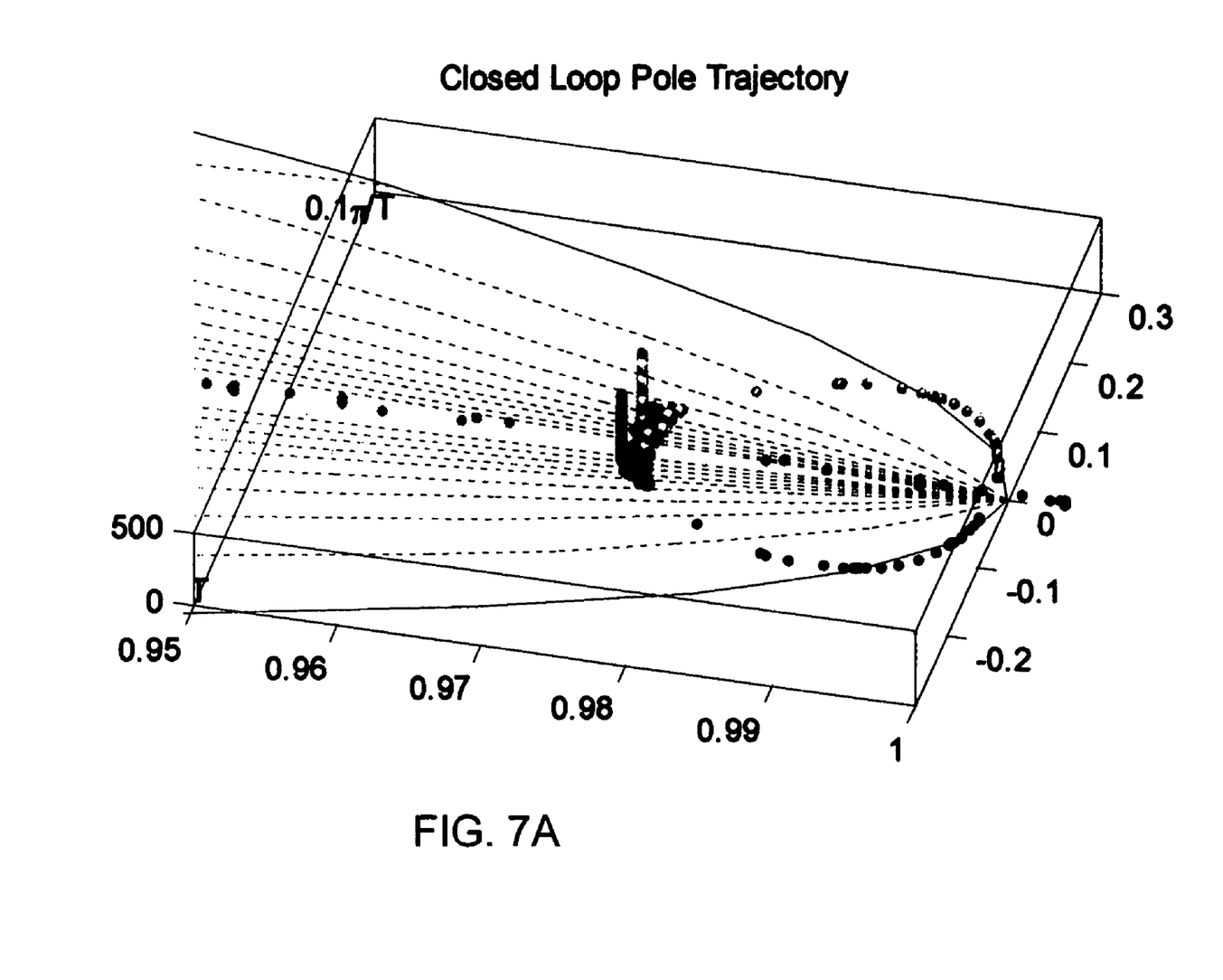
FIG. 7(a) shows a closed loop pole trajectory during and after tuning.
Figure 7B:
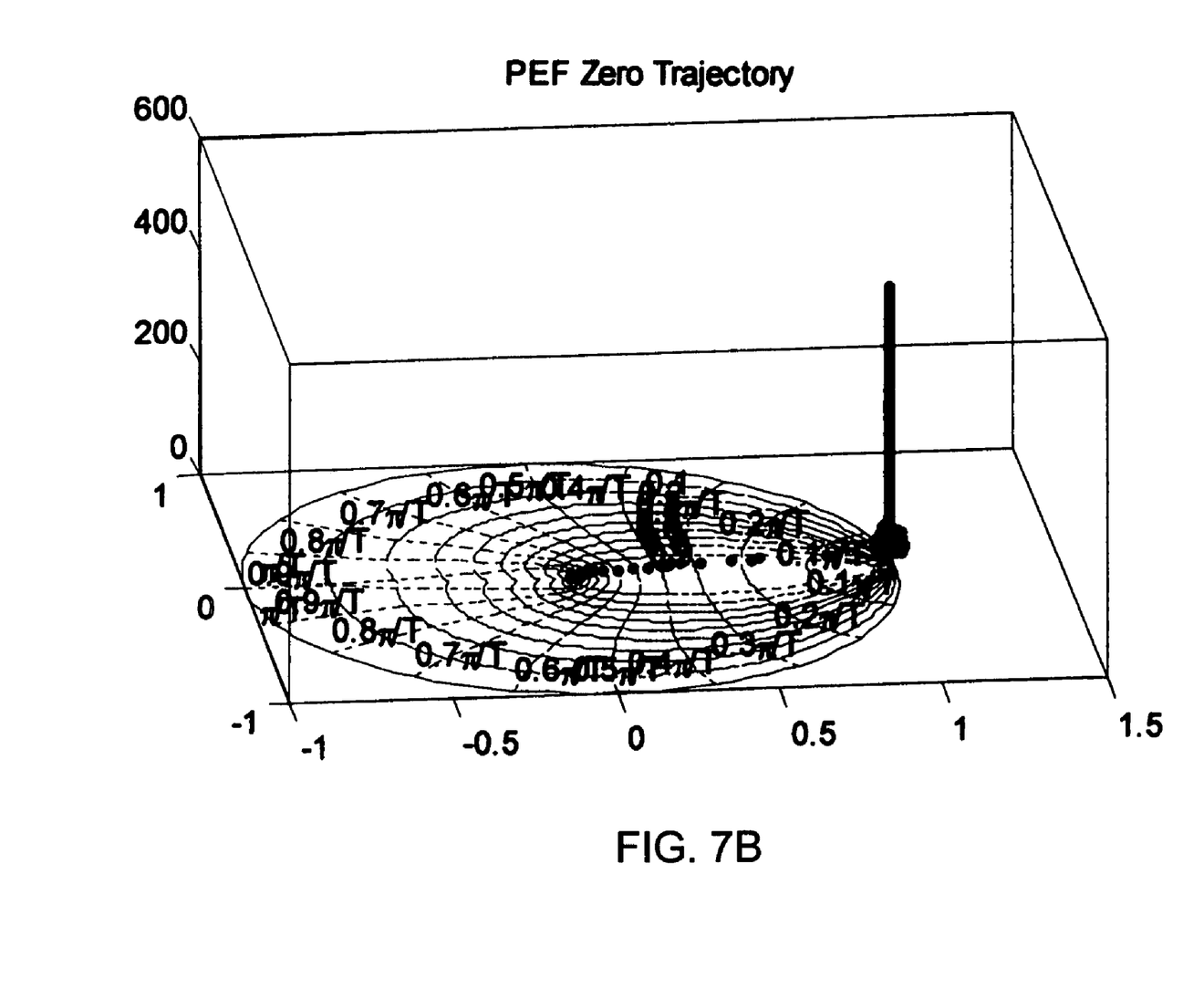
FIG. 7(b) shows the trajectory of the PEF zero during and after tuning.
Figure 7C:
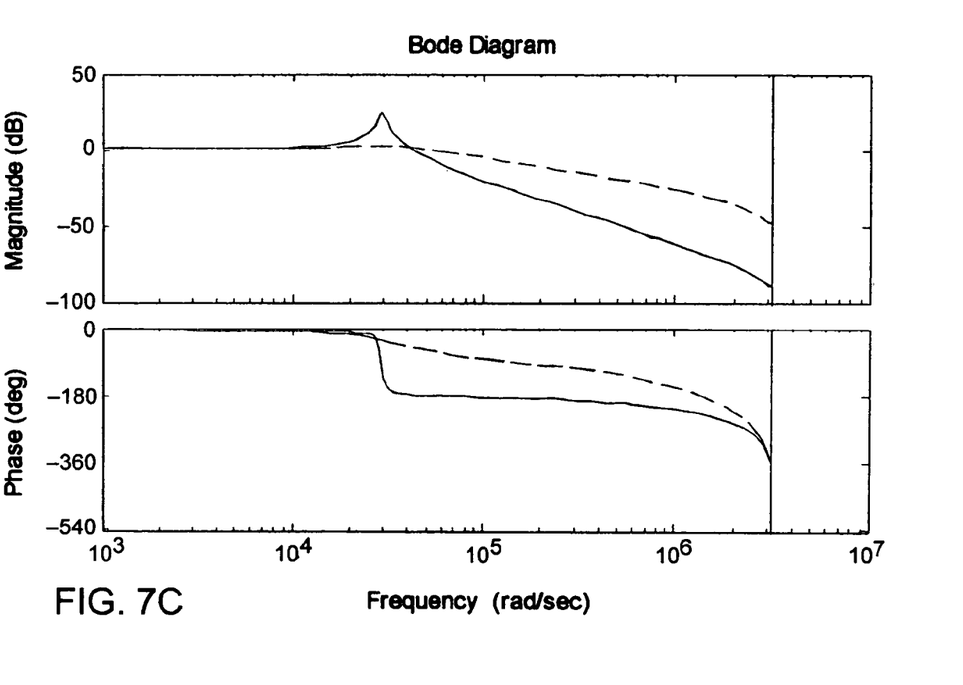
FIG. 7(c) shows a closed loop Bode plot before and after tuning.

The operation of the controller is illustrated in FIG. 6 which shows the capacitor voltage (Vo) 600 and inductor current 605 respectively when the regulator is subjected to load steps. It is evident from an examination of the Figure that the system is compensated. FIG. 7 shows the behaviour of the system poles and compensating zero during and after the tuning, with the closed-loop and open-loop Bode plots also appearing. In this context, FIG. 7(a) shows a closed loop pole trajectory during and after tuning, FIG. 7(b) shows the trajectory of the PEF zero during and after tuning and FIG. 7(c) shows a closed loop Bode plot before and after tuning.

Figure 8:
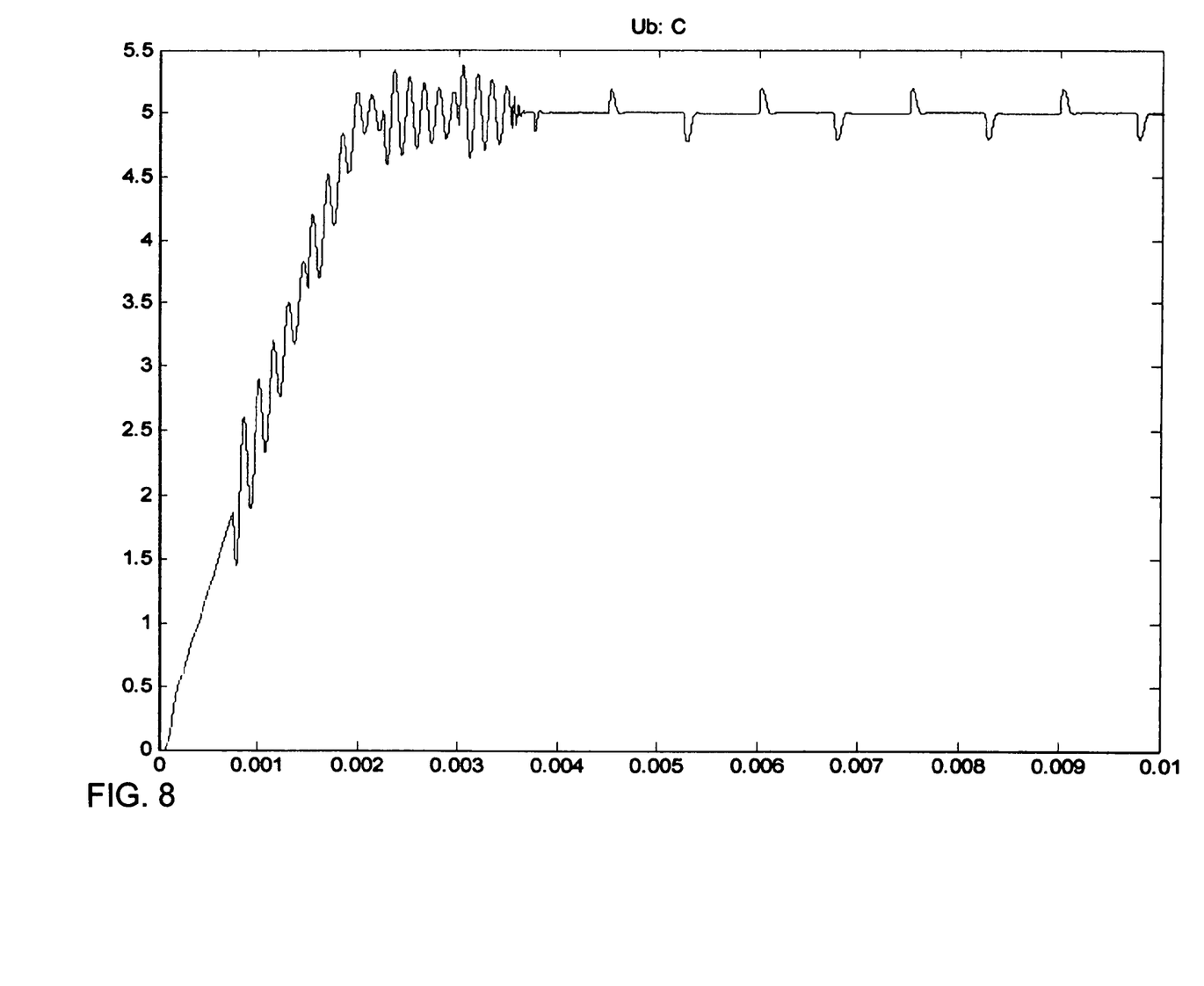
FIG. 8 shows the output of the circuit of FIG. 5, starting without the self-tuning turned on, with the tuning then being activated at time 0.0035.
Figure 9:
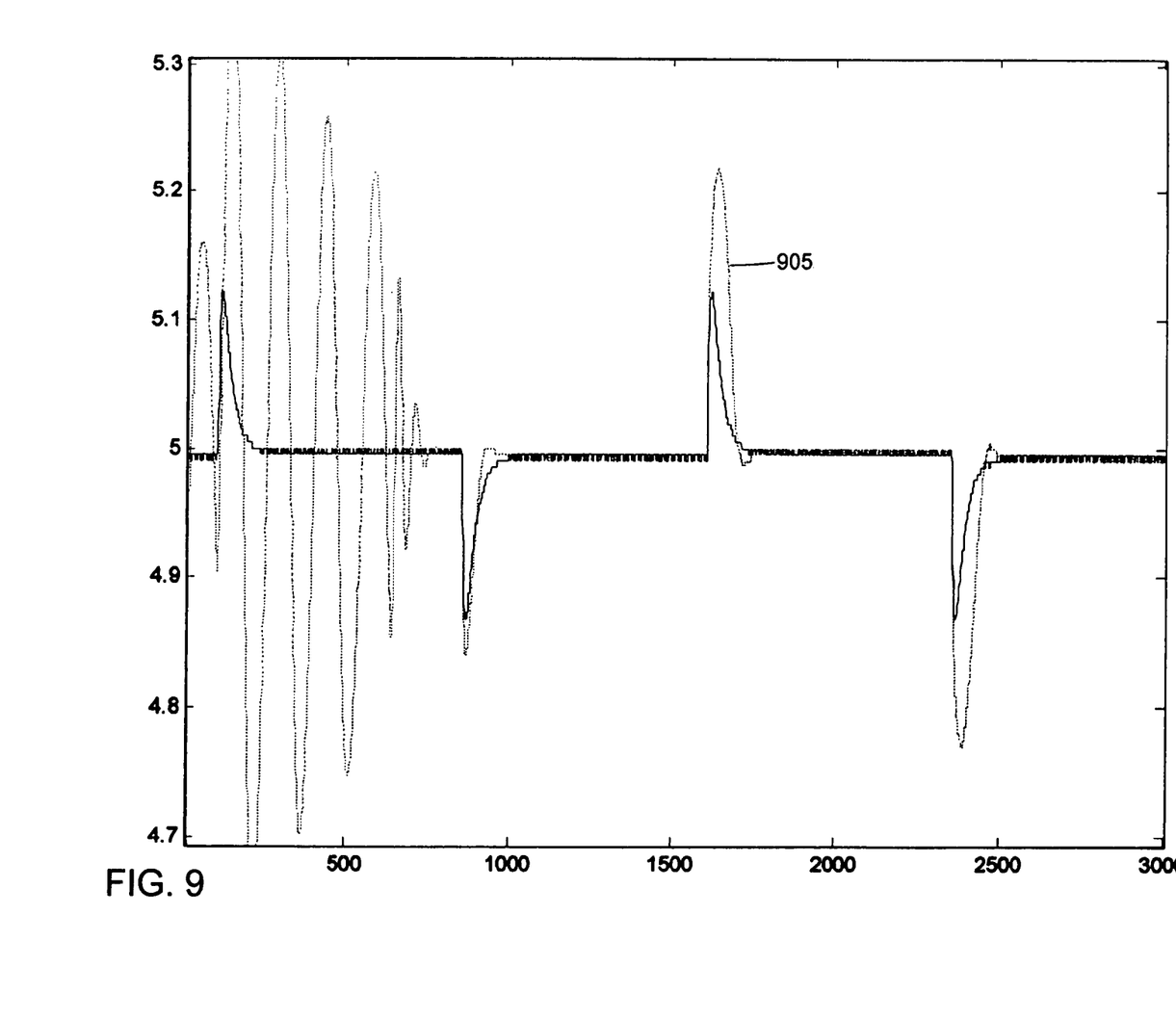
FIG. 9 shows a zoom of the transition as the tuning is activated (dash line), overlain with the waveform after 80 ms of tuning.
Figure 10:
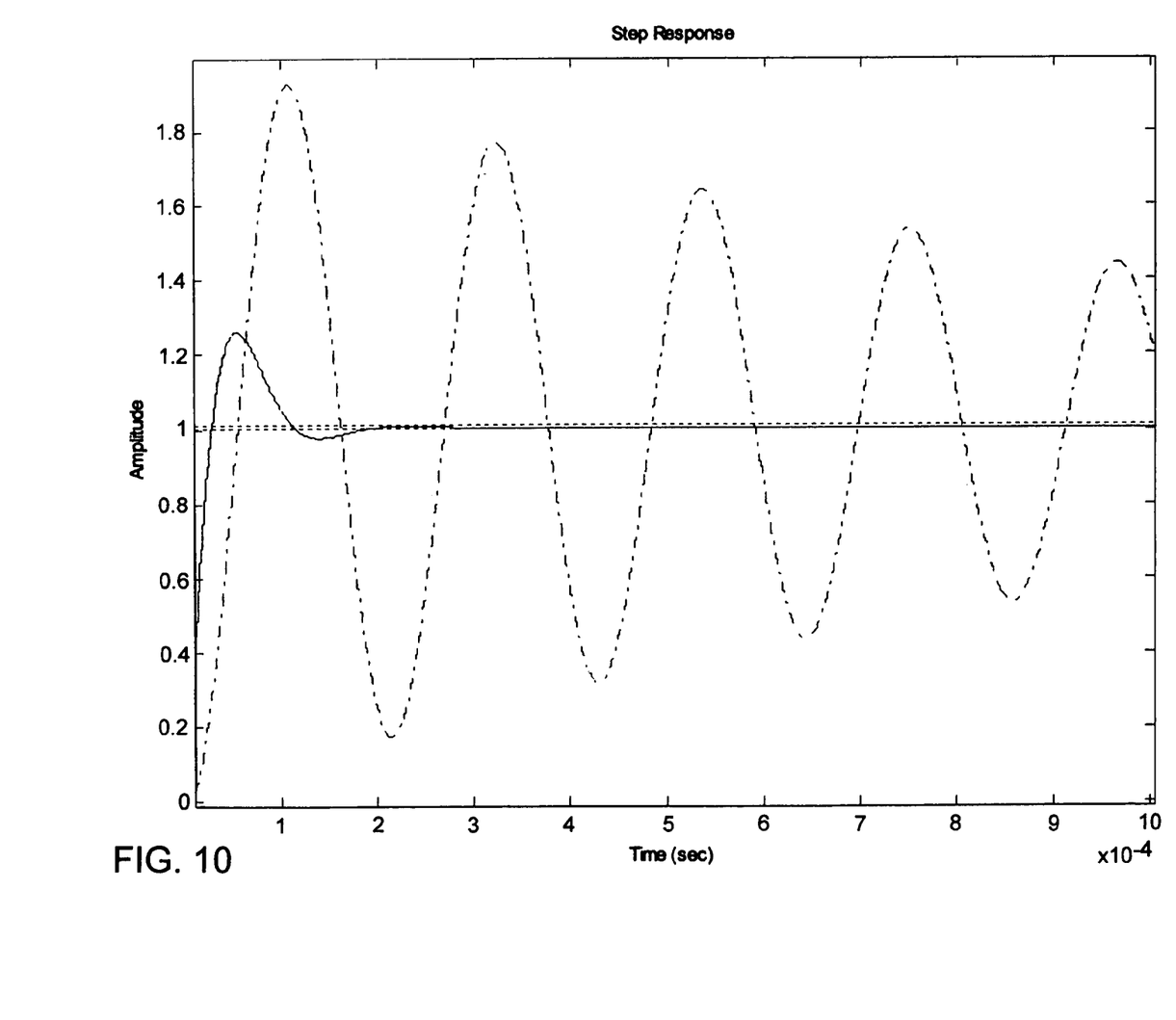
FIG. 10 shows a before/after step response for a circuit in accordance with some aspects of the invention.
Figure 11:
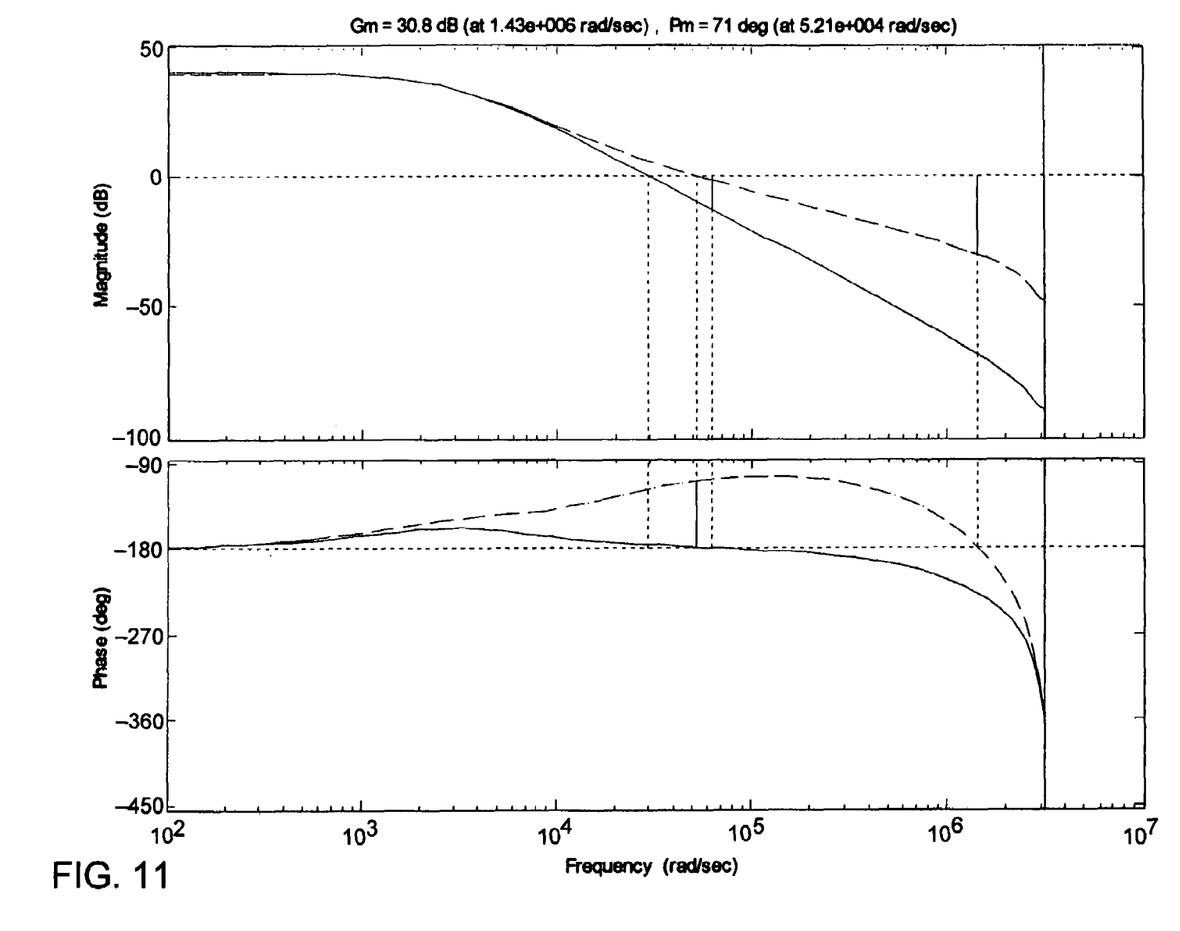
FIG. 11 shows an open Loop Bode plot before and after tuning, indicating final Gain & Phase Margins.

In order to represent the type of order of improvement achievable with the circuitry of the present invention, FIG. 8 shows the output starting without the self-tuning turned on, with the tuning then being activated at time 0.0035. It will be evident from an examination that the activation of the tuning achieves an immediate settling of the output. FIG. 9 is a zoom of the transition as the tuning is activated (dash line), overlaid with the waveform after 80 ms of tuning. In each of these plots, the output as shown is being disturbed periodically by a current load step 905. FIG. 10 shows an equivalent exemplary response before and after application of the technique of the present invention whereas FIG. 11 (which is an open-loop Bode plot showing the phase and gain margins before and after the auto-tuning from which it will be seen that the final gain and phase margins are of the order of 30 dB and 71 degrees respectively) shows the same response as a Bode plot.

Figure 12:
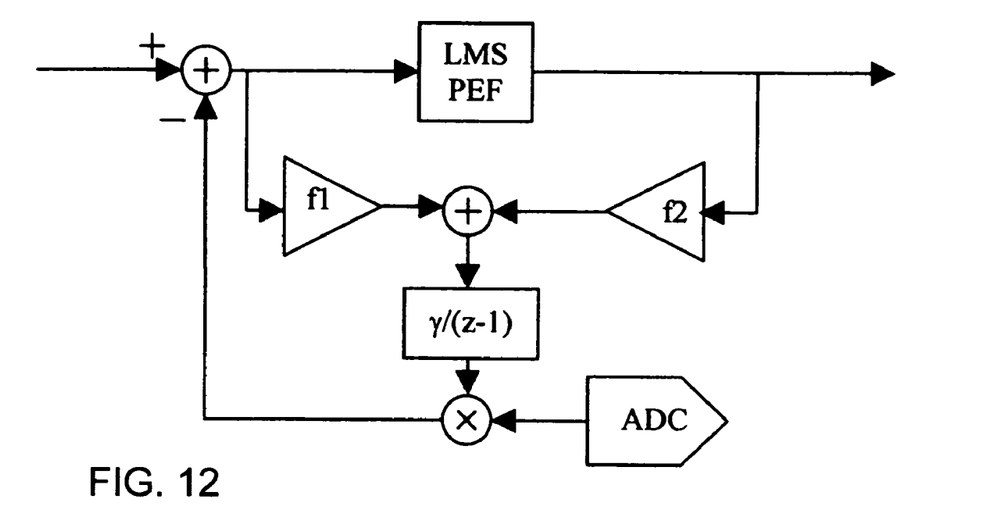
FIG. 12 shows a schematic of an additional loop which provides for zero steady state control error in the event of circuit non-idealities.

FIG. 12 shows a further embodiment which is specifically configured to provide for zero steady state error in the presence of component non-idealities. In this implementation general weighting values f1 & f2 are set initially within a bounded value determined by operation of the system. The weightings are summed and integrated and are used to balance any constant error within the system. Using the implementation of this circuit is particularly useful in situations where the steady-state control error is not exactly zero. In previously described implementations the PEF would have to cancel the steady-state error as the output tends to be white noise of zero mean. By taking this functionality away from the PEF and using the general weighting values to compensate for the coarse tuning of any fixed or DC error component means that the PEF is able to provide a more accurate estimate of the process and could ultimately lead to more accurate tuning.

It will be understood that aspects of the invention provide a control system that is always in a closed loop configuration but which on start up provides a learning dynamic wherein the loop learns the system features but as it is in closed loop can also react and compensate for any transients. As the control is implemented without system identification it does not require an estimation of the location of the poles of the plant which are especially sensitive to quantisation error at low frequencies, and it does not operate on the principles of certainty equivalence.

It will be appreciated by those skilled in the art that least-mean-square adaptive filters utilise a step-size factor in their operation, which is a gain factor affecting the error signal. The convergence of the LMS tap weights are a function of the gain factor. A short convergence time requires a large step-size factor, with a small step-size factor giving a longer convergence time. The value of the step-size factor also affects how noisy the tap-weight values are. Setting the step-size parameters too large can result in a divergence of the tap-weights. Therefore the step-size parameters are desirably set according to well known principles depending on the statistical nature of the filter's input signal. In many applications it is preferred to change the step-size parameter according to the power of the input signal, with a large input power corresponding to a lower step-size parameter value. This is achieved in the exemplary embodiment of the invention whereby the step-size parameters of the LMS PEF and LMS gain-factor are increased when the control error signal is below a certain value indicating that the loop has settled in to a controlled condition.

The present invention provides a control loop that incorporates the sensing of two error parameters. The first error parameter is a deviation of the control loop output from the desired output and the control system reacts by changing the input to the plant. The second error parameter is a prediction error component, which will deviate due to discrepancies introduced to the circuit as a result of ageing of the components making up the circuit, temperature fluctuations or the like. By monitoring both of these parameters the circuit provides for a control of the output in a self-tuning adaptive manner that heretofore was not achievable without system identification of the plant parameters. It will be appreciated that sensing of the prediction-error deviation as being a minimum value is representative of the loop being in a control mode.

Figure 13:
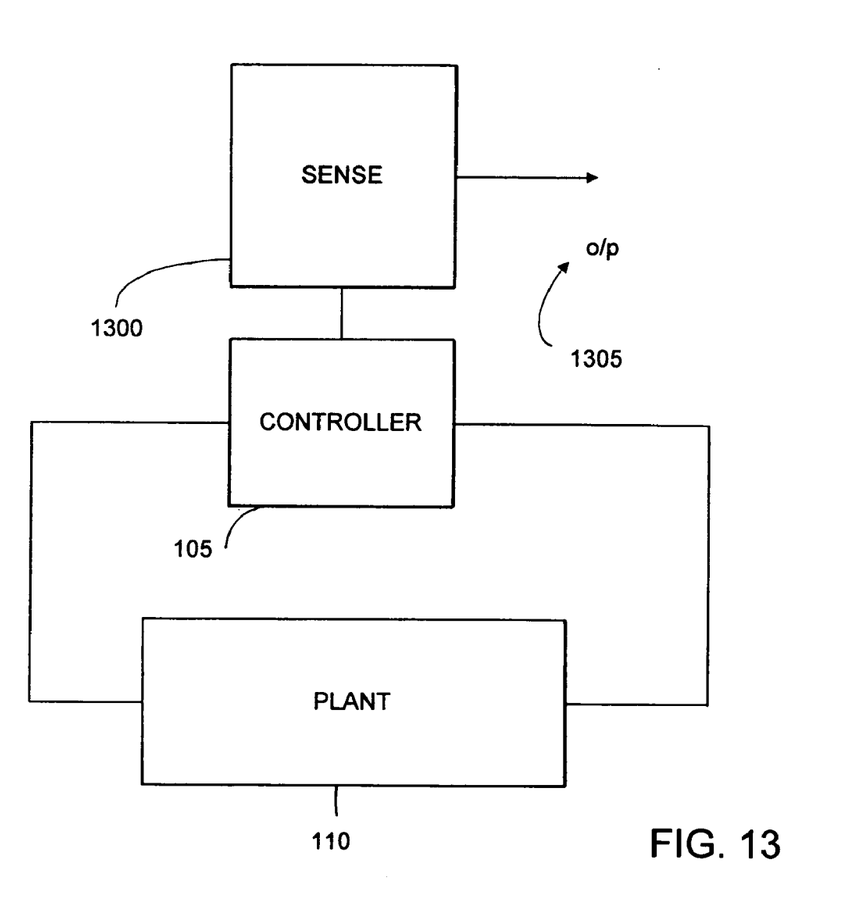
FIG. 13 shows a schematic of another embodiment configured to provide an alarm in the event of component failure.

Furthermore it will be understood that the error parameters used in the operation of the circuitry of the present invention utilise the fact that the tuning parameters will vary if the plant components change value over time. For example, in a power application components such as the capacitors change their value over time. The main failure mechanism for capacitors for example, is that their effective series resistance (ESR) increases, and they then burn up. The self-tuning regulator of the present invention would react to the ESR change, and so there would be evidence that the component values of the circuit had changed. Predicting that failure was imminent is one example of how this data could be utilised. Once the tuning parameters have settled out after startup, a circuit could monitor how the tuning parameters change over time and if the change is more than a pre-established limit, an alert could be flagged. FIG. 13 shows an example, in block schematic form, of such a sensing circuit 1300 which provides an alert at an output 1305 in the event that the characteristics of the circuit, the plant, being controlled by the controller show evidence of a large change in the plant parameters which could be indicative of component failure. It will be appreciated that certain parameters may have an allowable fluctuation with temperature and the sensing circuit may therefore include a temperature sensor providing an indicator of the operating temperature of the plant. The sensing circuit may be configured to compare any detected deviation with respect to an allowed deviation for that operating temperature before providing an alarm.

It will be appreciated that what has been described herein are exemplary embodiments of a control system. Specific components, features and values have been described with reference to specific embodiments and Figures but it will be appreciated that such embodiments and Figures are to be interpreted and construed in a non-limiting fashion as the scope of the invention should not be limited in any way except as may be deemed necessary in the light of the appended claims. Similarly where specific components are described with reference to one Figure, it will be understood that such components may be substituted or included in other Figures without departing from the spirit or scope of the invention. Furthermore, the words comprises/comprising when used in the specification are used to specify the presence of stated features, integers, steps or components but does not preclude the presence or use or addition of one or more other features, integers, steps, components or groups thereof.

The invention claimed is:

1. A control system for a plant operable in a closed control loop configuration, the system having a controller which includes a prediction error filter and an adaptive gain element, the prediction error filter being configured to tune control parameters of the controller so as to provide for self tuning of the controller, and wherein the control system is configured to control the plant:
   a. initially during a start up of the control loop, setting a set point (Vos) of the control loop and an output of the plant both equal to 0,
   b. increasing the set point (Vos), by means of a soft startup to a desired output,
   c. setting the gain of the adaptive gain element of the controller so as to emulate an open loop configuration,
   d. monitoring a prediction error signal of the prediction error filter so as to detect any deviation of that signal from what would be expected from a white noise response, and
   e. on detection of the deviation, enabling both the prediction error filter and adaptive gain element to react so as to restore a mean value of the deviation to 0.

2. The system as claimed in claim 1 wherein the gain element defines a gain parameter defines a combination of the gain parameter and the at least one control parameter defining a time and frequency response of the controller.

3. The system as claimed in claim 2 wherein the gain parameters and the control parameters are independently modifiable.

4. The system as claimed in claim 2 wherein an input of the controller controls the gain of the adaptive gain element.

5. The system as claimed in claim 2 wherein an output of the prediction error filter controls the gain of the adaptive gain element.

6. The system as claimed in claim 1 wherein the prediction error filter includes a least-mean-square (LMS) adaptive filter.

7. The system as claimed in claim 6 wherein the least-mean-square (LMS) adaptive filter provides as an output a prediction of an auto-regressive (AR) process, the system being farther configured to provide an error parameter indicative of a difference between an actual value of the AR process and a predicted value of the AR process, the error parameter defining a prediction error.

8. The system as claimed in claim 7 wherein the LMS filter includes a plurality of taps, each tap having an associated weighting, and wherein the weighting of the individual taps are modifiable so as to minimize the prediction error.

9. The system as claimed in claim 1 wherein the plant is a switch mode power supply.

10. The system as claimed in claim 1 further including a pseudo random noise generator, the generator configured to provide a pseudo-random disturbance as an input to the system.

11. The system as claimed in claim 2 wherein the adaptive gain component is a variable gain element and the system further includes a fixed gain element.

12. The system as claimed in claim 11 wherein a value of the fixed gain element is determined with respect to a value of plant parameters.

13. The system as claimed on claim 11 wherein the plant is a buck converter switch mode power supply and the value of the fixed gain element is defined by a ratio of inductor value and sample period of the plant.

14. The system as claimed in claim 1 further including a setpoint feedforward element configured to provide a zero steady state control error.

15. The system as claimed in claim 14 further including circuitry configured to provide for zero steady state control error in the presence of plant and component non-idealities.

16. The circuit as claimed in claim 15 wherein the circuitry includes first and second weighting components each having a weighting value, the weighting values of the first and second weighting components being summed and integrated to modify a gain value of the loop.

17. The system as claimed in claim 2 further including a delay parameter, the delay parameter being configured to enable any gain changes effected by the adaptive gain element to take effect within the control loop before the loop is modified further.

18. A method of controlling a plant provided in a closed control loop configuration with a corresponding controller, the method including steps of including within the controller a prediction error filter and an adaptive gain element, the prediction error filter being configured to tune control parameters of the controller so as to provide for self tuning of the controller, the method including the steps of:
   a. initially during a start up of the control loop, setting a set point (Vos) of the control loop and an output of the plant both equal to 0,
   b. increasing the set point (Vos), by means of a soft startup to a desired output,
   c. setting the gain of the adaptive gain element of the controller so as to emulate an open loop configuration,
   d. monitoring a prediction error signal of the prediction error filter so as to detect any deviation of that signal from what would be expected from a white noise response, and
   e. on detection of the deviation, enabling both the prediction error filter and adaptive gain element to react so as to restore a mean value of the deviation to 0.

19. The method as claimed in claim 18 wherein the adaptive gain element defines a gain parameter, a combination of the gain parameter and the at least one control parameter defines a time and frequency response of the controller.

20. The method as claimed in claim 19 wherein the gain parameter and the control parameter are independently modifiable.

21. The method as claimed in claim 19 wherein an input of the controller controls the gain of the adaptive gain element.

22. The method as claimed in claim 19 wherein an output of the prediction error filter controls the gain of the adaptive gain element.

23. The method as claimed in claim 18 wherein the prediction error filter includes a least-mean-square (LMS) adaptive filter.

24. The method as claimed in claim 23 wherein the least-means square (LMS) adaptive filter provides as an output a prediction of an auto-regressive (AR) process, the method further providing an error parameter indicative of a difference between an actual value of the AR process and a predicted value of the AR process, the error parameter defining a prediction error.

25. The method as claimed in claim 23 wherein the LMS filter includes a plurality of taps, each tap having an associated weighting, and wherein the weighting of the individual taps are modifiable so as to minimize the prediction error.

26. The method as claimed in claim 18 wherein the plant is a switch mode power supply.

27. The method as claimed in claim 18 wherein the controller further includes a pseudo random noise generator which is configured to provide a pseudo-random disturbance as an input to the system.

28. The method as claimed in claim 19 wherein the adaptive gain component is a variable gain component and the controller further includes a fixed gain element.

29. The method as claimed in claim 28 wherein the value of the fixed gain element is determined with respect to a value of plant parameters.

30. The method as claimed in claim 29 wherein the plant is a buck converter switch mode power supply and the value of the fixed gain element is defined by a ratio of inductor value and sample period of the plant.

31. The method as claimed in claim 18 wherein the controller further includes a setpoint feedforward element configured to provide a zero steady state control error.

32. The method as claimed in claim 31 wherein the controller further includes circuitry configured to provide for zero steady state control error in the presence of plant and component non-idealities.

33. The method as claimed in claim 32 wherein the circuitry includes first and second weighting components each having a weighting value, the weighting values of the first and second weighting components being summed and integrated to modify a gain value of the loop.

34. The method as claimed in claim 19 further including a delay parameter, the delay parameter being configured to enable any gain changes effected by the adaptive gain element to take effect within the control loop before the loop is modified further.

* * * * *